9869X
Sheet 1. 2 Sheets.
M. Freytag.
Ice Breaker.
Patented July 2, 1836.
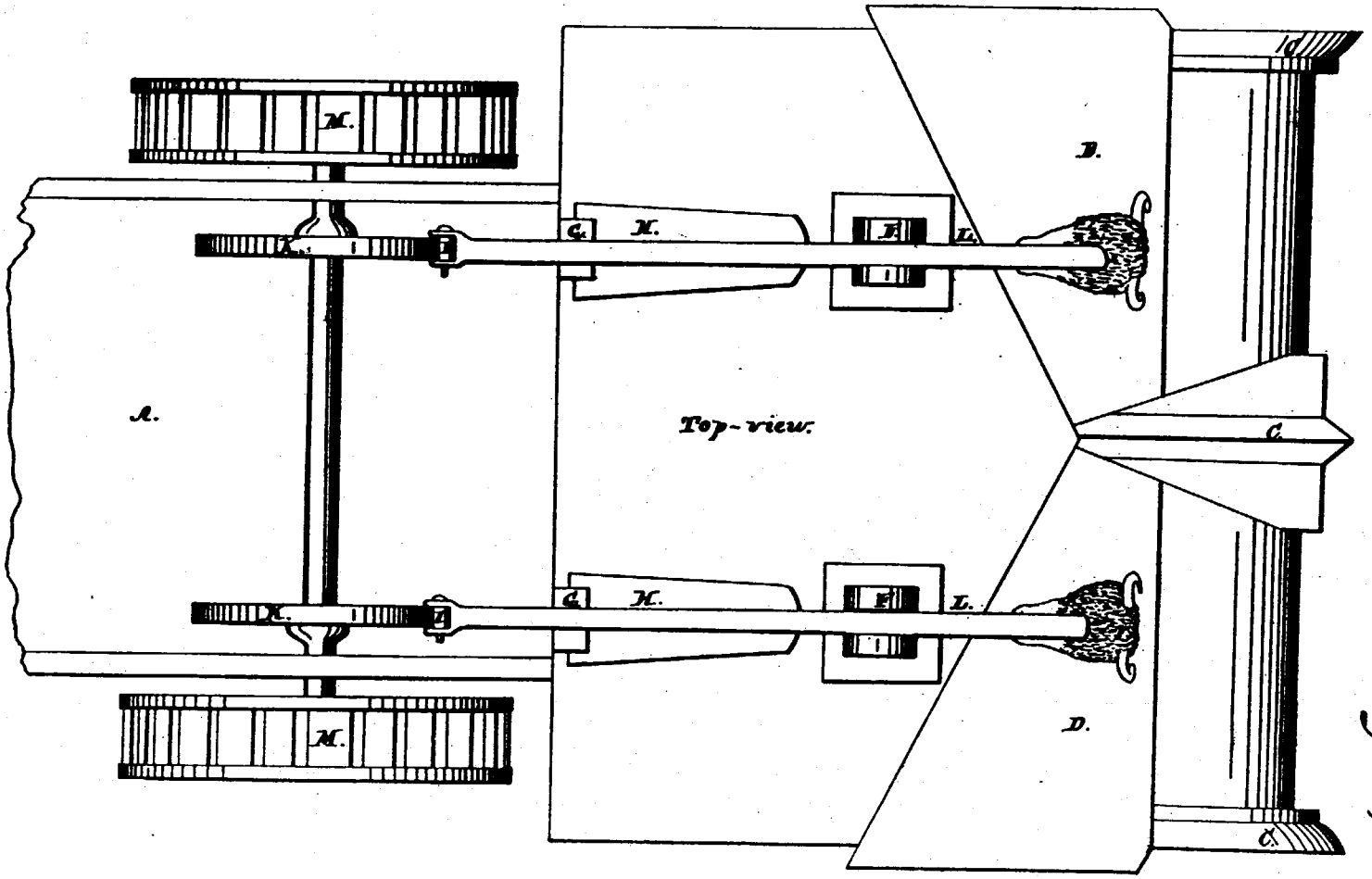
N. PETERS, PHOTO-LITHOGRAPHER, WASHINGTON, D. C.

o Printed Specification Available
Sheet 2. 2 Sheets.
9869X
M. Freytag.
Ice Breaker.
Patented July 2, 1836.
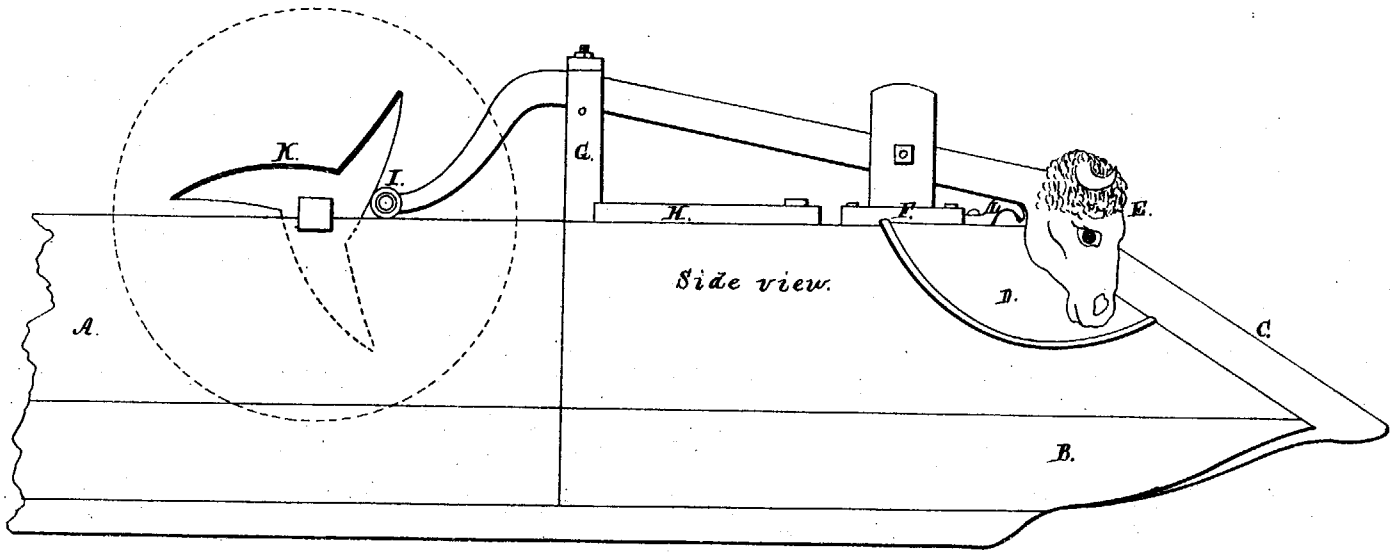
N. PETERS, PHOTO-LITHOGRAPHER, WASHINGTON, D. C.

Michael Freytag
Letters Patent

9869X

The Schedule referred to in these Letters Patent and making part of the
same containing a description in the words of the said Michael Freytag him-
self of his improvement in the Ice Breaker"

---

Be it known that I Michael Freytag of Moyamensing in the County of
Philadelphia and State of Pennsylvania have invented a new and useful im-
provement being a machine for clearing harbours and other waters navigable
during winter called "Freytag's Ice Breaker" which is described as follows
reference being had to the annexed drawing of the same making part of this speci-
fication. This machine consists of a boat A. of a size and strength sufficient
to contain and support the machinery required for propelling it and operat-
ing the hammers or ice breakers hereafter described and sustaining the shock
necessarily produced in passing through thick ice. It is shaped at the bow like
a wedge or inclined plane B. & is sheathed with iron, having two three or more
iron rails, ways, or guards C well fastened on the upper side and upon which
the ice slides as the boat advances. At the upper part of the inclined plane
and supported by the same on each side thereof is a concave iron apron D.
upon which the large pieces of ice are to be broken. These aprons also incline
to the right and left and are twisted like a spirally shaped wing for throwing
the ice out of the way on each side. Two hammers E. something like tilt ham-
mers each weighing from one to five tons or more if required are provided for
breaking the ice upon the aprons. The levers of these hammers move on swivel fulcra
F. placed near the bow of the boat. The long arm of each lever moves between
guides G. set in a slide H. for throwing the hammers in and out of gear. At
the long end of each lever is a friction saving roller I. The hammers are rais-
ed by cams K. on the shaft of the propelling wheels which come in contact
with the friction saving rollers. The shaft has one or more cranks connected
to the steam engine or engines in the usual manner and by which the ma-
chine is operated. The wheels of the boat are to be made very strong. Opera-
tion. The engine or engines being put in motion the boat is propelled forward,
the

9869X the edge of the inclined plane [illegible] the [illegible] paper [illegible] by the
power of the machine [illegible]
[illegible] of the inclined plane [illegible] the apron [illegible]
[illegible] of the [illegible] by the [illegible]
[illegible] the apron [illegible] being operated by
the crank shaft [illegible] The [illegible] may be thrown
[illegible] of gear by [illegible] to the right or left [illegible]
[illegible]
[illegible]
[illegible]
[illegible]
[illegible]
[illegible] What I claim as my invention and which
I desire to secure by Letters Patent [illegible]
[illegible]
[illegible]

Michael [illegible]

Witnesses
Wm. P. Ellis
[illegible]

(Patented 2 July 1830)

Recd.
[illegible]

Drawing

6'75 [illegible]

2 July 1830